G. W. BELDAM & A. U. B. RYALL.
PNEUMATIC OR ELASTIC WHEEL TIRE.
APPLICATION FILED OCT. 19, 1914.
1,220,934.
Patented Mar. 27, 1917.
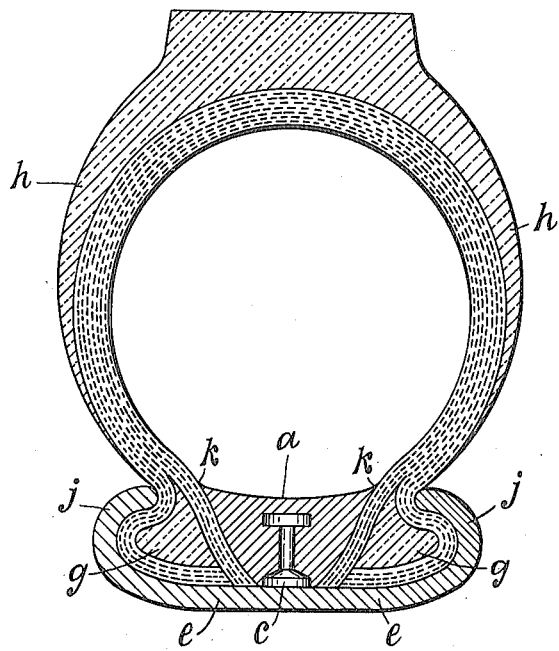
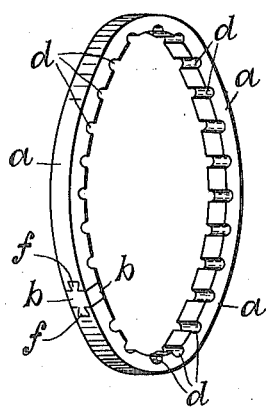
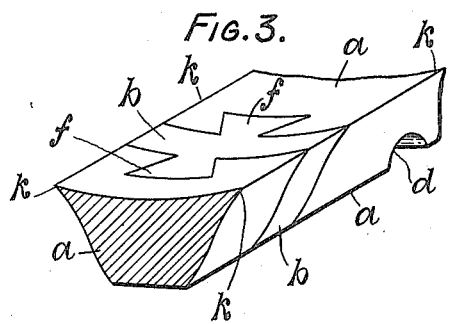
Witnesses
E. E. Johansen
F. M. Meyer
Inventors
G. W. Beldam,
A. U. B. Ryall.
By their Attorney,

UNITED STATES PATENT OFFICE.

GEORGE WILLIAM BELDAM, OF EALING, AND ALBERT URIAH BENJAMIN RYALL, OF BRENTFORD, ENGLAND.

PNEUMATIC OR ELASTIC WHEEL-TIRE.

1,220,934.     Specification of Letters Patent.     Patented Mar. 27, 1917.

Application filed October 19, 1914. Serial No. 867,471.

*To all whom it may concern:*

Be it known that we, GEORGE WILLIAM BELDAM and ALBERT URIAH BENJAMIN RYALL, subjects of the King of England, and residents of Ealing, in the county of Middlesex, England, and Brentford, in the county of Middlesex, England, respectively, have invented new and useful Improvements Connected with Pneumatic or Elastic Wheel-Tires, of which the following is a specification.

This invention has reference to tires and wheels, primarily or mainly, of self-propelled vehicles used on common roads, and wherein security bands are used inside penumatic tires for holding them in the rim, that is, in the flanges of the rim; and an object of the invention is to provide a simple and effective means of the kind referred to for holding the tires in position on wheel rims with flanges, in which the beads of the tire cover fit, and which have to be placed in position or forced over the flanges when putting the tire on the rim.

The security band is made extensible, and in one form is composed wholly or mainly of rubber; while in another case it has one or more elastic parts arranged in its length in such a manner that the band can be stretched, and passed over the rim flanges, and placed on the cylindrical or central portion of the rim.

The band is so constructed and arranged, that after stretching it over the rim, it will retract and fit tightly on the rim without being "slack", but just a tight fit; and it is shaped at the sides or edges to lie on the inside surface of the portion or edges of the tire cover where the beads or equivalent parts of it come; and by its use bolt-valves, security bolts, and the like, as means of holding a tire in the rim, are obviated or rendered unnecessary.

Further, according to this invention, in a security band of the kind referred to, pieces of metal are in some cases used, and so arranged as to extend wholly or partially through the band from the inner surface to the outer, and to be in contact with the rim, and are adapted to conduct the heat from the interior of the tire to the rim, whence the heat is dissipated in revolving through the air.

The security band according to this invention, is illustrated in the accompanying drawings, in which Figure 1 is a transverse section of a pneumatic tire with the security band in position.

Fig. 2 is a perspective view of a security band detached; and Fig. 3 is a detail view to an enlarged scale of part of a band of the slightly extensible type.

In the drawings $a$ designates the body of the band; and $d$ are grooves in the inner surface of it, which serve to provide spaces between the rim $e$ and the band, and the outer edges of which grooves come on the inner side of the band $d$, and serve to grip the rim better than a plain band.

The band in one construction is composed wholly or mainly of rubber, and in this and other cases is shaped at the edges or sides to lie on the inside surfaces of the tire beads $g$. The band will be made endless, by joining the ends of the strip or bar of which it is made together, by canvas or any other suitable way.

The meeting edges or margins of the sides of the band, and of the surface on which the inner tube of the tire bears, are tapered off to fine or thin edges $k$ for the purpose of providing smooth or flush unions or joins with the tire cover, and obviating the occurrence of edges which cause friction against the inner tube, and the consequential fraying of the parts.

In the construction shown in Figs. 2 and 3, the band is only slightly elastic, but can be stretched so as to be enabled to be pressed on to the rim over the flange. The greater part of the band in this case is inextensible, viz., the body $a$ is the inextensible part, and is mainly of textile or like fabric or textile fabric and rubber, or other suitable material; and the extensible or elastic part $b$ is of india rubber or analogous material or composition; and in the case shown has wedge or dovetail ends $f$ fitting into dovetail apertures in the ends of the inextensible part. There may be one only, or any required number of rubber parts $b$.

The metal devices or pieces $c$ are of rivet shape, one plate or head of which is anchored in the body $a$ of the band, and the other comes on the surface of the band which makes contact with the metal rim $e$.

When the metal devices $c$ are used, they will be more or less closely arranged all around the band.

In some cases, the band may as a whole, be slightly extensible, by making it of more or less short lengths of plies or laminæ, interleaved with one another, of textile fabric, held together by rubber solution. Thus while the band is freely extensible as a whole, or extensible at one or more parts, or slightly extensible as a whole, it is always sufficiently elastic to enable it to be stretched over the flanges of the rim, and retract on to the body of the rim, and grip the same firmly; and it provides a firm or stable surface for the inner tube when it is inflated.

In another case, the band may be made partly, or largely of ordinary soft rubber, or partly of hard rubber; the latter being inextensible.

What is claimed is:—

1. The combination with a vehicle wheel rim comprising a body portion and flanges, and a removable resilient tire, of an endless extensible security band of considerable elasticity, the said band having an interior circumference less than the circumference of the rim, the said band adapted to be stretched and passed over the said flanges, the said band retracting and gripping the middle of the body portion of the rim.

2. The combination with a vehicle wheel rim comprising a body portion and flanges, and a removable resilient tire, of an endless security band of considerable elasticity, the said band having a flat interior surface and tapering sides engaging the tire beads and rim respectively, the said band having an interior circumference less than the circumference of the rim, the said band adapted to be stretched and passed over the said flanges, the said band retracting and gripping the middle of the body portion of the rim.

3. The combination with a vehicle wheel rim comprising a body portion and flanges, and a removable resilient tire, of an endless security band, the said band composed of lengths of extensible and non-extensible material, the said band having a flat interior surface and tapering sides, the said band having an interior circumference less than the circumference of the rim, the said security band stretched and passed over the flanges of the rim and positioned between the tire beads and gripping the center of the body portion of the rim both when the tire is inflated and deflated.

4. The combination with a vehicle wheel rim comprising a body portion and flanges, and a removable tire, of an endless extensible security band, the said band having a flat interior surface and tapering sides, the said band having an interior circumference less than the circumference of the rim, the band having transverse grooves on its flat interior surface, the said band stretched and passed over the flanges of the rim and gripping the inner surface of the body portion of the rim, the said grooves providing means for preventing circumferential movement of the said band.

5. The combination with a vehicle wheel rim comprising a body portion and flanges, and a removable tire, of an endless extensible security band the inner surface of the said band provided with metallic members engaging and gripping the body portion of the rim, the said band stretched and passed over the flanges of the rim and gripping the center of the body portion thereof between the beads of the tire.

6. The combination with a vehicle wheel rim comprising a body portion and flanges, and a resilient removable tire, of an endless extensible security band, the said band having a flat interior surface and tapering sides, metallic members carried by the flat interior surface of the band and gripping the body portion of the rim, the said band having an interior circumference less than the circumference of the rim, the said band stretched and passed over the flanges of the rim and gripping the body portion of the rim between the tire beads, the tapering sides of the band snugly fitting the said tire beads.

7. The combination with a vehicle wheel rim comprising a body portion and flanges, a resilient removable tire, of an endless extensible security band of considerable elasticity, the said band stretched and passed over the flanges of the rim and gripping the body portion of the rim between the tire beads, the said band having tapering sides to snugly fit the said tire beads, the parts arranged as and for the purpose described.

8. The combination with a vehicle wheel rim comprising a body portion and flanges, and a removable tire, of an endless extensible security band having transverse grooves on its inner surface, pieces of metal carried by the said band, between the grooves and extending from the outer to the inner surfaces of the said band, the band being stretchable over the flanges and retractable on to the rim body to make contact therewith, and firmly grip it with the edges of the grooves engaging the surface of the rim body portion and the metal pieces in direct contact therewith.

In testimony whereof we have signed our names to this specification in the presence of two subscribing witnesses.

GEORGE WILLIAM BELDAM.
ALBERT URIAH BENJAMIN RYALL.

Witnesses:
S. J. EARL,
CHAS. J. FALCONER.